United States Patent
Morimura

(10) Patent No.: US 11,973,636 B2
(45) Date of Patent: Apr. 30, 2024

(54) PERFORMING NETWORK COMMUNICATION REGARDLESS OF STATE OF NETWORK CONNECTED DEVICE

(71) Applicant: CANON KABUSHIKI KAISHA, Tokyo (JP)

(72) Inventor: Kazuhiko Morimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/935,011

(22) Filed: Sep. 23, 2022

(65) Prior Publication Data
US 2023/0097596 A1 Mar. 30, 2023

(30) Foreign Application Priority Data
Sep. 27, 2021 (JP) .................. 2021-156397

(51) Int. Cl.
*H04L 41/0663* (2022.01)
*H04L 41/0631* (2022.01)
*H04L 41/0659* (2022.01)

(52) U.S. Cl.
CPC ...... *H04L 41/0663* (2013.01); *H04L 41/0631* (2013.01); *H04L 41/0659* (2013.01)

(58) Field of Classification Search
CPC ............. H04L 41/0631; H04L 41/0659; H04L 41/0661; H04L 41/0663; H04L 12/433; H04L 45/742; H04L 49/3009; B60L 50/64; G06F 15/17381; G06F 3/0638; H02M 7/4835
See application file for complete search history.

(56) References Cited

U.S. PATENT DOCUMENTS

| | | | |
|---|---|---|---|
| 6,772,219 B1* | 8/2004 | Shobatake | H04L 49/3009 709/227 |
| 7,664,018 B2* | 2/2010 | Warren | H04L 12/433 370/258 |
| 2001/0052056 A1* | 12/2001 | Acton | G06F 15/17381 709/251 |
| 2006/0059196 A1* | 3/2006 | Sato | H04L 45/742 |
| 2016/0132242 A1* | 5/2016 | Mehrotra | G06F 3/0638 711/103 |
| 2017/0274902 A1* | 9/2017 | Kumada | B60L 50/64 |

(Continued)

FOREIGN PATENT DOCUMENTS

JP  2017103588 A  6/2017

*Primary Examiner* — Le H Luu
(74) *Attorney, Agent, or Firm* — Canon U.S.A., Inc. IP Division

(57) ABSTRACT

A communication device includes a first communication interface for a first transmission path, a second communication interface for a second transmission path, a control unit that controls a communication path internal to the communication device of a signal received by the first communication interface, and a processing unit that performs predetermined processing on the received signal, wherein the control unit performs control to output, in a case where the communication device is in a first state, the received signal to the second communication interface via the processing unit, and output, in a case where the communication device is in a second state, the received signal to the second communication interface by bypassing the processing unit.

12 Claims, 6 Drawing Sheets

(56) References Cited

U.S. PATENT DOCUMENTS

| | | | |
|---|---|---|---|
| 2023/0109050 A1* | 4/2023 | Ergin | H02M 7/4835 363/53 |
| 2023/0198831 A1* | 6/2023 | Masuda | H04L 41/0631 370/225 |

* cited by examiner

ALL NODES IN ACTIVATED STATE

NODE 101-3 IN POWER CUT-OFF STATE

NODE 101-3 IN STANDBY STATE

PERFORMING NETWORK COMMUNICATION REGARDLESS OF STATE OF NETWORK CONNECTED DEVICE

BACKGROUND

Field

The present disclosure relates to a control technique in a communication device connected to a network.

Description of the Related Art

A star topology is known as a typical connection form (topology) in a communication network. Depending on the installation environment and operating conditions, connections can be made using a daisy chain topology such as a ring topology or a line topology. For example, in an information transmission device for a railroad vehicle including a plurality of terminal devices discussed in Japanese Patent Application Laid-Open No. 2017-103588, the terminal devices are connected using the line topology.

In a network of the line topology as discussed in Japanese Patent Application Laid-Open No. 2017-103588, it is necessary that all connected communication devices operate. Thus, if, as a result of one or more of the connected communication devices being set to a standby state (failure state/sleep state), some functions are restricted, other communication devices connected beyond such communication devices can become unable to communicate. As a consequence, availability of an entire network system can be significantly reduced.

SUMMARY OF THE INVENTION

The present disclosure is directed to enabling communication in a network even when a communication device connected to the network is in a standby state (failure state/sleep state).

According to an aspect of the present disclosure, a communication device includes a first communication interface for a first transmission path, a second communication interface for a second transmission path, a control unit configured to control a communication path internal to the communication device of a signal received by the first communication interface, and a processing unit configured to perform predetermined processing on the received signal, wherein the control unit performs control to output, in a case where the communication device is in a first state, the received signal to the second communication interface via the processing unit, and output, in a case where the communication device is in a second state, the received signal to the second communication interface by bypassing the processing unit.

Further features of the present disclosure will become apparent from the following description of exemplary embodiments with reference to the attached drawings.

DESCRIPTION OF THE EMBODIMENTS

Exemplary embodiments for carrying out the present disclosure will be described below in detail with reference to the accompanying drawings. The exemplary embodiments described below are examples for realizing the present exemplary embodiment and can be appropriately modified or changed depending on the configuration of a device to which the present exemplary embodiment is applied and various conditions. The present disclosure is not limited to the exemplary embodiments below. Not all combinations of features described in the exemplary embodiments are necessarily needed to implement the features of the present disclosure.

[Configuration of Network System]

Figure 1:
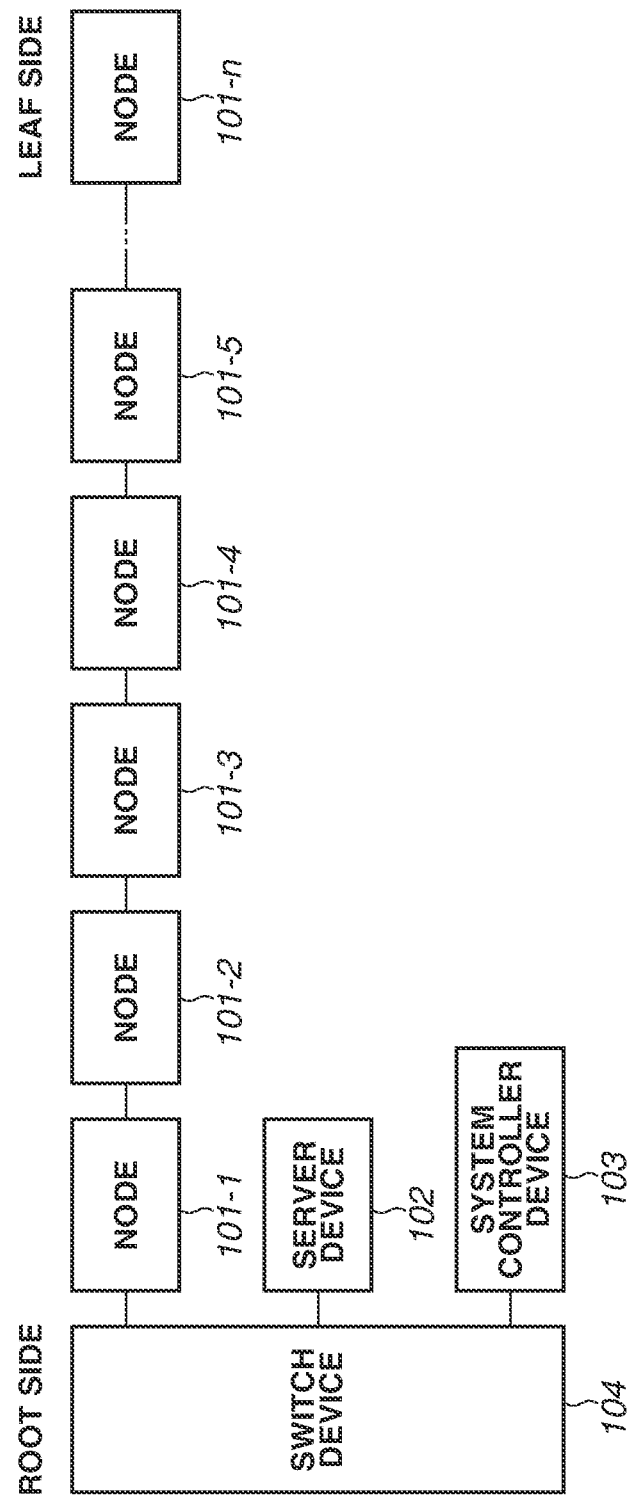
FIG. 1 illustrates a configuration example of a network system according to an exemplary embodiment.

FIG. 1 illustrates a configuration example of a network system (communication system) according to an exemplary embodiment. The network system is configured to include nodes (communication devices) 101-1 to 101-$n$ (n>1) connected linearly with respect to each other, a server device 102, a system controller device 103, and a switch device 104. In the description below, for description purposes, the nodes 101-1 to 101-$n$ can be generically referred to as "nodes 101". For description purposes, "node 101" can be used when only one "node" needs to be referred to.

In FIG. 1, with regard to the nodes 101, a side closer to the switch device 104 is referred to as a root side, while the side farther from the switch device 104 is referred to as a leaf side. As described below with reference to FIG. 2, a node 101 includes two physical layer (PHY) units 202 and 205 as input/output units, and can be connected to another node 101. As a result, any number of nodes 101 can be arranged and connected in a linear shape.

The node 101-1 on the side closest to the root is connected to the switch device 104. The node 101-$n$ on the side closest to the leaf is connected to just the node 101 immediately before the node 101-$n$, and thus, only one input/output unit can be provided.

The switch device 104, by connecting to the server device 102, has a function of switching a network that enables each of the nodes 101 to communicate with the server device 102. The system controller device 103 manages and monitors the nodes 101.

As described below with reference to FIG. 2, each node 101 includes a sensor unit 213 and a state control unit 212, where the system controller device 103 can control the sensor unit 213 and the state control unit 212.

[Configuration of Node]

Figure 2:
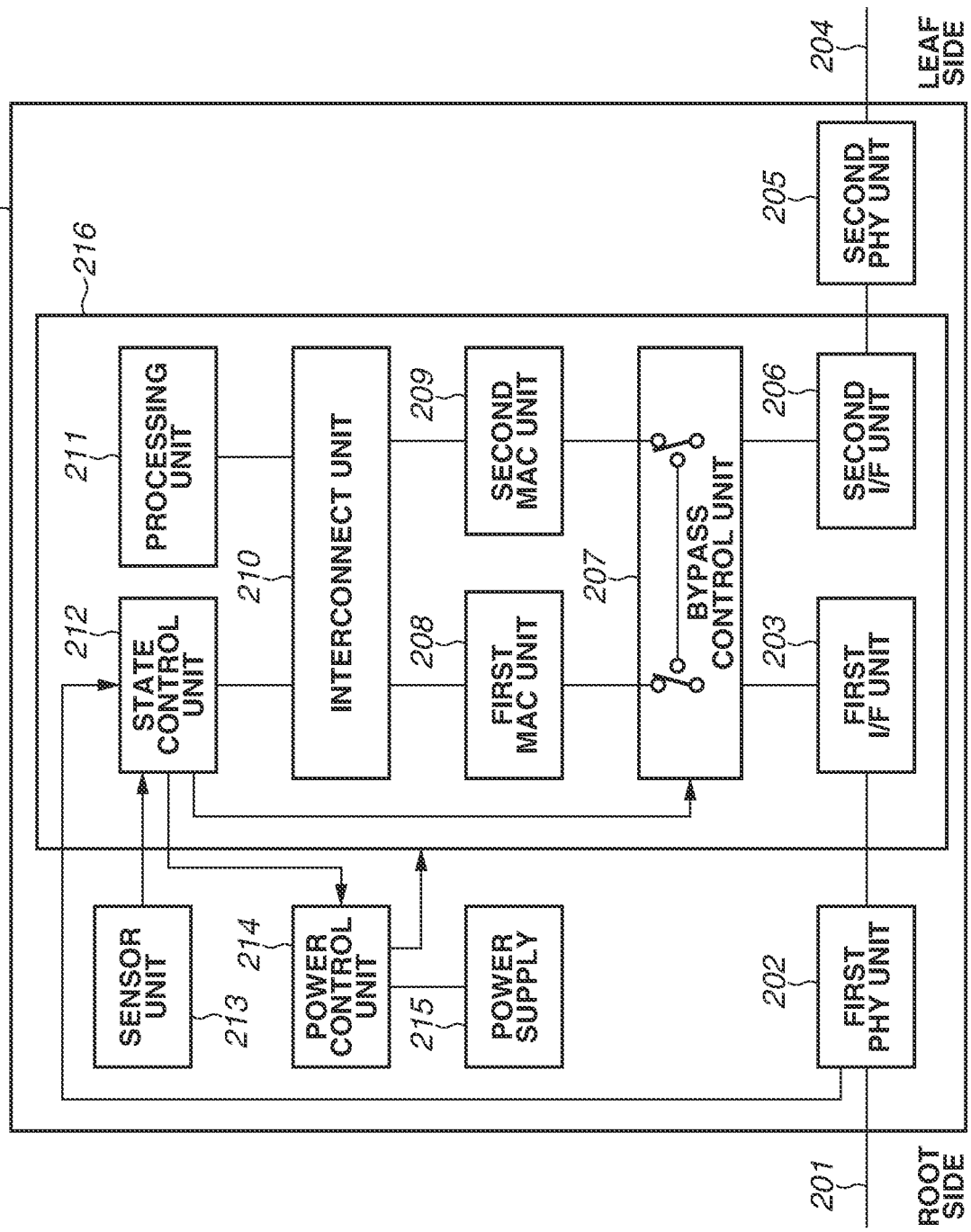
FIG. 2 illustrates a configuration example of a node (communication device) according to an exemplary embodiment.

FIG. 2 illustrates a configuration example of a node (communication device) 101 according to the present exemplary embodiment. The node 101 illustrated in FIG. 2 is connected to a first transmission path 201 on the root side and a second transmission path 204 on the leaf side. The node 101 includes two PHY units, the first PHY unit 202 and the second PHY unit 205, as the input/output units. The first PHY unit 202 and the second PHY unit 205 are configured to execute transmission and reception processing corresponding to a physical layer of an Open Systems Interconnection (OSI) reference model. For example, the first PHY unit 202 and the second PHY unit 205 execute transmission and reception processing corresponding to the physical layer of Ethernet™.

The first PHY unit 202 and the second PHY unit 205 are connected to a system control unit 216 via a first interface (I/F) unit 203 and a second I/F unit 206, respectively. The system control unit 216 includes a field programmable gate array (FPGA) or an application specific integrated circuit (ASIC). The first I/F unit 203 and the second I/F unit 206 are configured to transmit and receive data between the first PHY unit 202 and the second PHY unit 205 respectively. In the present exemplary embodiment, the first PHY unit 202 and the first I/F unit 203 are referred to as a first communication interface for the first transmission path 201, and the second PHY unit 205 and the second I/F unit 206 are referred to as a second communication interface for the second transmission path 204. The configuration of the first communication interface and the second communication interface is not limited to the above-described configuration, and any configuration can be used as long as the first communication interface and the second communication interface function as input/output units with regard to the transmission paths 201 and 204 and can be connected to a processing unit 211 described below.

A bypass control unit 207 controls a communication path of signals in the node 101. More specifically, the bypass control unit 207 performs control that enables switching between a first path and a second path. The first path is a path that directly connects the first communication interface (the first PHY unit 202 and the first I/F unit 203 in the present exemplary embodiment) and the second communication interface (the second PHY unit 205 and the second I/F unit 206 in the present exemplary embodiment). The second path is a path that connects the first communication interface to the second communication interface via at least the processing unit 211. In the present exemplary embodiment, the second path is a path enabling a connection with the state control unit 212 and the processing unit 211 via an interconnect unit 210 by the first communication interface being connected to a first Media Access Control (MAC) unit 208 and the second communication interface being connected to a second MAC unit 209. The processing unit 211 performs protocol processing (processing in an upper layer), and thus, the first path is a path that does not pass through the processing unit 211, and the second path is a path that passes through the processing unit 211.

The bypass control unit 207 can switch such paths under the control of the state control unit 212. The state control unit 212 can be arranged external to the system control unit 216.

The first MAC unit 208 is configured to execute processing corresponding to a MAC sublayer of a data link layer of the OSI reference model for the first transmission path 201 if connected to the first I/F unit 203. The second MAC unit 209 is configured to execute the processing corresponding to the MAC sublayer of the data link layer of the OSI reference model for the second transmission path 204 if connected to the second I/F unit 206.

The interconnect unit 210 is configured to connect the first MAC unit 208, the second MAC unit 209, the processing unit 211, and the state control unit 212 with each other.

The processing unit 211 includes, for example, one or more central processing units (CPUs), and performs various types of control of the node 101. The processing unit 211 can execute various control programs to perform the control. The processing unit 211 can perform the predetermined protocol processing (processing by an upper layer) on a signal received via the interconnect unit 210. Part or all of the processing in a digital area of the system control unit 216 can be performed by the processing unit 211 executing software (a program).

The state control unit 212 controls and manages state transition of the node 101. The states that the node 101 can be in will be described below with reference to FIG. 3. The state control unit 212 can control and manage the state transition of the node 101 based on input information from the sensor unit 213 and the first PHY unit 202. While not illustrated in FIG. 2, the second PHY unit 205 is connected to the state control unit 212, and the state control unit 212 can control and manage the state transition of the node 101 based on the input information from the second PHY unit 205. The state control unit 212 can control the bypass control unit 207 and a power control unit 214 based on the state of the node 101.

The sensor unit 213 performs various types of monitoring processing on the node 101, such as system monitoring and environment monitoring. For example, the sensor unit 213 has a watchdog function and can monitor whether the processing unit 211 and the system control unit 216 are operating normally (system monitoring). The sensor unit 213 can monitor an ambient temperature and a voltage of a power supply 215 (environmental monitoring).

By performing such monitoring processing, the sensor unit 213 can detect an abnormality in the node 101. In the present exemplary embodiment, if the sensor unit 213 detects an abnormality, the sensor unit 213 can determine whether the abnormality is an abnormality where communication is unavailable in the second path, or an abnormality where communication is unavailable in the first and second paths. The abnormality where communication is unavailable in the second path includes, for example, an abnormality where a hardware error occurs in the system control unit 216 and the processing unit 211 does not operate normally. The abnormality where communication is unavailable in the first and second paths includes an abnormality where, for example, electronic components of the system control unit 216 are thought to have failed due to a temperature rise or an impact on the system control unit 216, and it is necessary to immediately shut off the power supply 215.

When an abnormality is detected, the sensor unit 213 notifies the state control unit 212 of a determination result of whether the abnormality is an abnormality where communication is unavailable in the second path or an abnormality where communication is unavailable in the first and second paths.

The power control unit 214 supplies electric power to each unit in the node 101 by using electric power supplied from the power supply 215 or the like. The power control unit 214 supplies electric power to each unit in the node 101 including the system control unit 216 under the control of the state control unit 212. While the power supply 215 is illustrated in FIG. 2, in another exemplary embodiment, electric power can be supplied from a source external to the node 101. A clock (not illustrated) is also supplied to each unit in the node 101 while the power control unit 214 is supplying electric power to each unit in the node 101.

[State Transition of Node 101]

Figure 3:
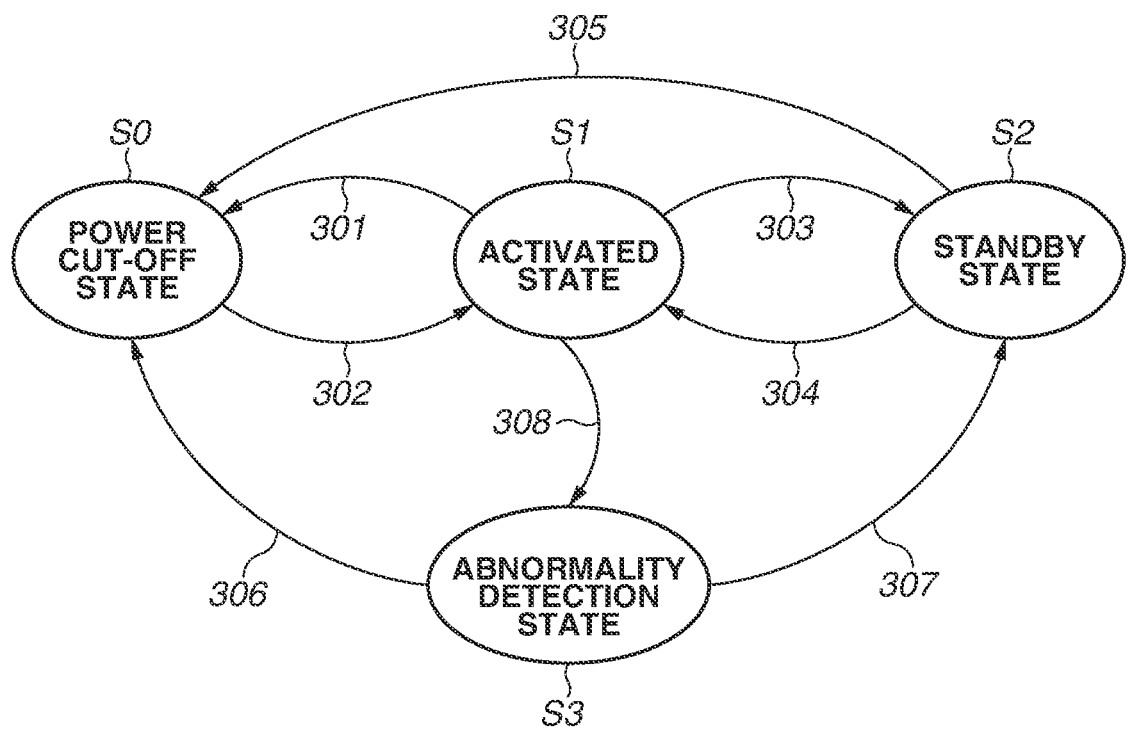
FIG. 3 is a conceptual diagram illustrating a state transition of a node according to an exemplary embodiment.

Next, the state transition of the node 101 will be described with reference to FIG. 3. FIG. 3 is a conceptual diagram illustrating the state transition of the node 101 according to the present exemplary embodiment. The states of the node 101 include a power cut-off state S0, an activated state S1, a standby state S2, and an abnormality detection state S3.

The power cut-off state S0 is a power stop state where electric power is not supplied (stopped) to the node 101 by the power control unit 214. In the power cut-off state S0, if electric power is supplied to the node 101 by the power control unit 214 and activation is complete, the state of the node 101 transitions to the activated state S1 (transition 302). In the activated state S1, electric power and a clock are supplied to each unit in the node 101.

Figure 4:
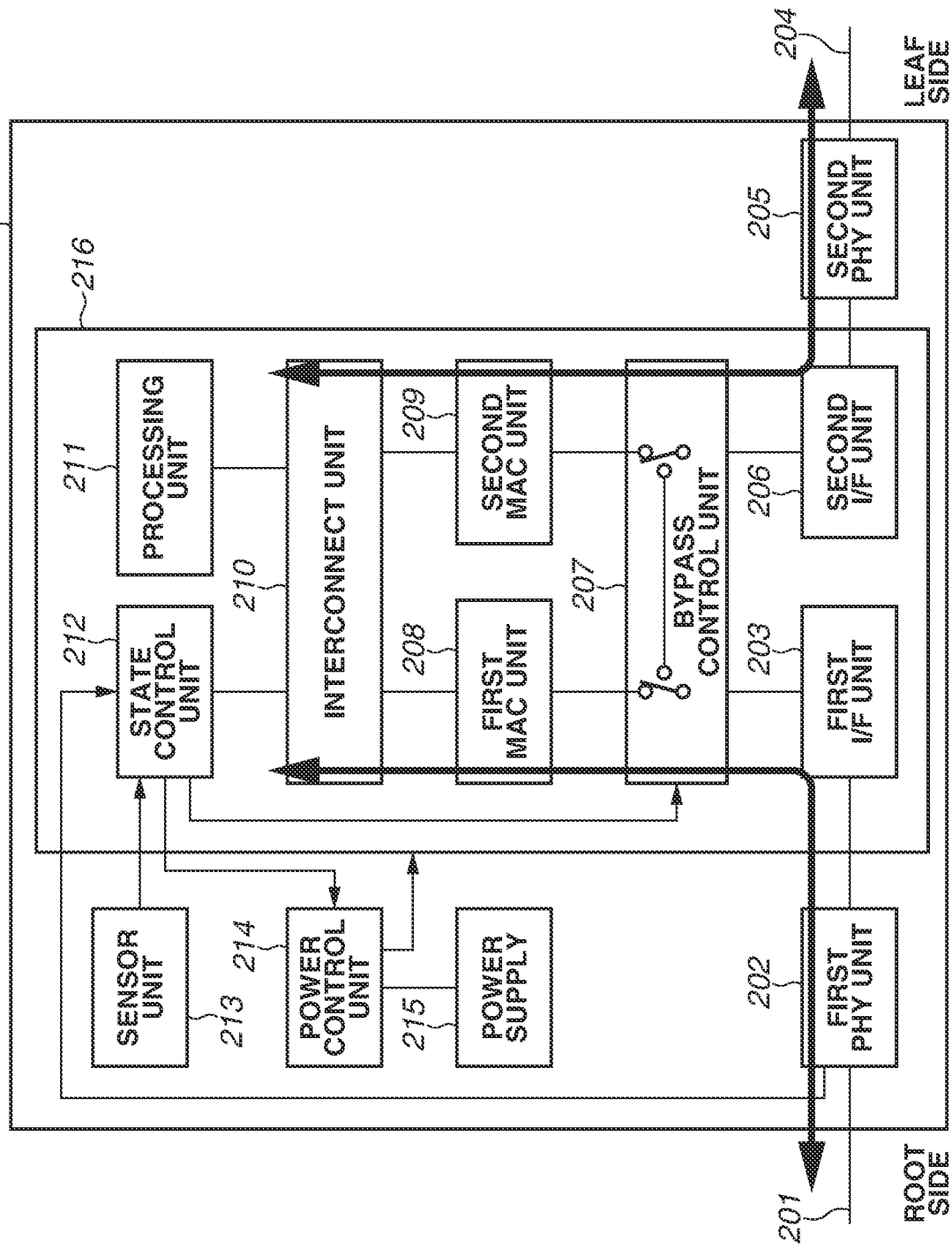
FIG. 4 is a diagram illustrating a communication path of a signal in a node in an activated state.

The communication path of a signal in the node 101 in the activated state S1 will be described with reference to FIG. 4. FIG. 4 is a diagram illustrating the communication path of the signal in the node 101 in the activated state S1.

As illustrated in FIG. 4, in the activated state S1, a signal received by the first PHY unit 202 from the first transmission path 201 is processed by the first MAC unit 208 via the bypass control unit 207. The signal processed by the first MAC unit 208 is conveyed to the processing unit 211 or the state control unit 212 via the interconnect unit 210 and is processed therein.

The signal processed by the second MAC unit 209 is transmitted by the bypass control unit 207 to a node 101 on the leaf side via the second PHY unit 205 via the second transmission path 204. The same applies when a signal is received from the second transmission path 204 by the second PHY unit 205, and the received signal is processed via the second MAC unit 209 and the first MAC unit 208.

If the node 101 in the activated state S1 does not receive a signal from the first transmission path 201 or the second transmission path 204 for a predetermined period set in advance, based on an instruction from the processing unit 211 or the state control unit 212, the state of the node 101 can be transitioned to the standby state S2 (transition 303). The state control unit 212 can transition the state of the node 101 to the standby state S2 if receiving a signal for transitioning to the standby state S2 via the first PHY unit 202 or the second PHY unit 205. The state control unit 212 can transition the state of the node 101 to the standby state S2 when a processing operation by the processing unit 211 is not confirmed for a predetermined period. Thus, the trigger for transitioning the state of the node 101 to the standby state S2 is not limited to a specific trigger.

The state control unit 212 can transition the state of the node 101 from the standby state S2 to the power cut-off state S0 if, for example, a signal for transitioning to the power cut-off state S0 is received via the first PHY unit 202 or the second PHY unit 205 (transition 302). Such a transition is also not limited to a specific trigger.

As will be described below, in response to the detection of an abnormality in a specific node 101 in the activated state S1, the state control unit 212 transitions the state of the node 101 to the abnormality detection state S3 (transition 308). The abnormality detection is performed by the sensor unit 213.

In the abnormality detection state S3, it is determined whether the abnormality is an abnormality where communication is unavailable in the second path or an abnormality where communication is unavailable in the first and second paths. If it is determined that the abnormality is an abnormality where communication is unavailable in the second path, the state is transitioned to the standby state S2 (transition 307). If it is determined that the abnormality is an abnormality where communication is unavailable in the first and second paths, the state is transitioned to the power cut-off state S0 (transition 306).

Figure 5:
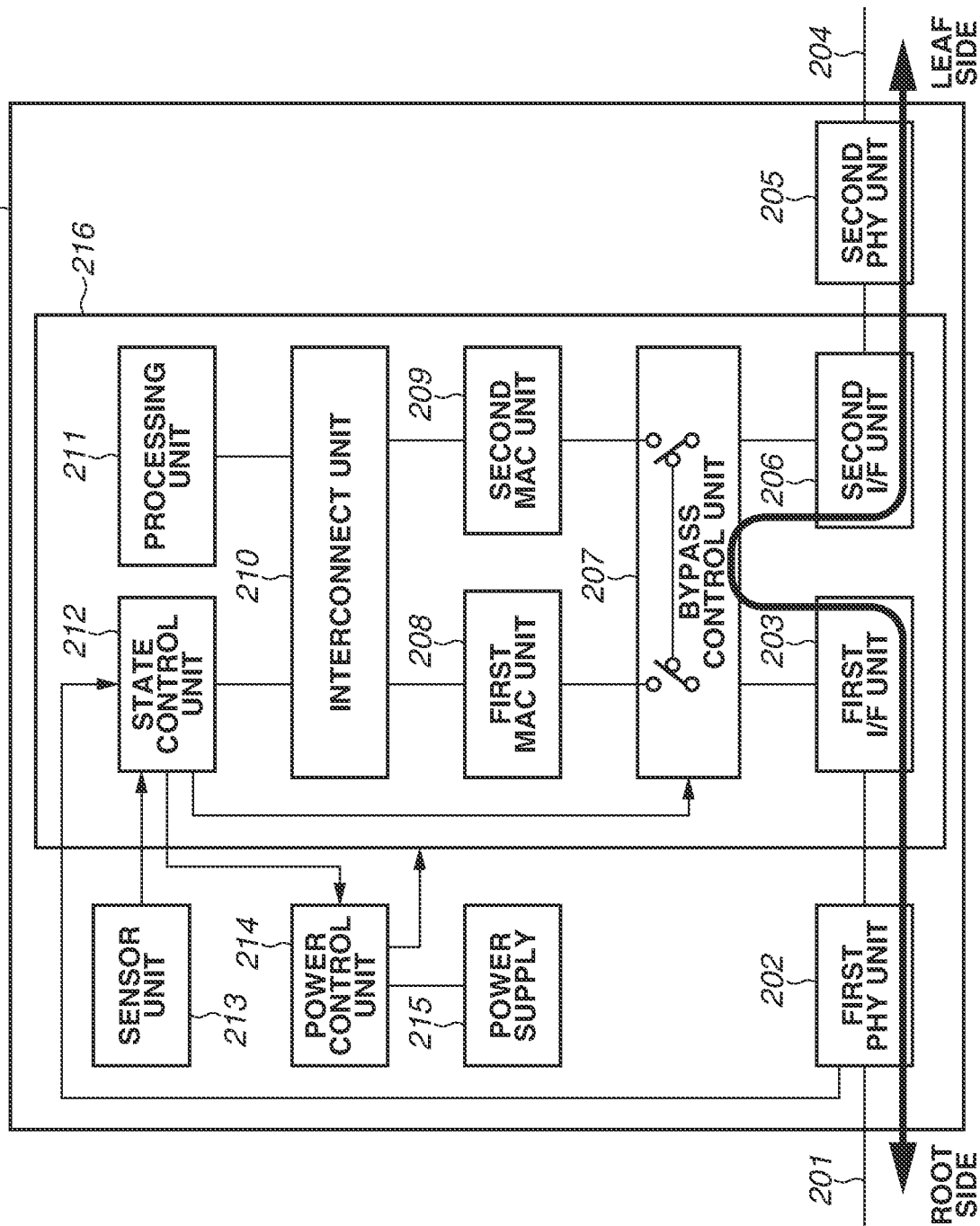
FIG. 5 is a diagram illustrating a communication path of a signal in a node in a standby state.

In the standby state S2, the node 101 is in a state where functions of the processing unit 211 and some communication functions are restricted. The communication path of a signal in the node 101 in the standby state S2 will be described with reference to FIG. 5. FIG. 5 is a diagram illustrating the communication path of the signal in the node 101 in the standby state S2.

In the standby state S2, the state control unit 212 is in a state of controlling the bypass control unit 207. The bypass control unit 207 is controlled to convey the signal received from the first transmission path 201 by the first PHY unit 202 to the second PHY unit 205, and covey the signal received from the second transmission path 204 by the second PHY unit 205 to the first PHY unit 202.

In the present exemplary embodiment, such an operation of the node 101 is referred to as a repetition operation state. When the node 101 is in the repetition operation state, the first MAC unit 208, the second MAC unit 209, the interconnect unit 210, and the processing unit 211 do not need to operate. More specifically, the signal received by the first PHY unit 202 is output to the second PHY unit 205 by bypassing the processing unit 211, and the signal received by the second PHY unit 205 is output to the first PHY unit 202 by bypassing the processing unit 211. This enables the node 101 to convey the signal received in one transmission path to the other transmission path.

The transition of the node 101 from the standby state S2 to the activated state S1 will now be described. In the node 101 in the standby state S2, the signal received by the first PHY unit 202 or the second PHY unit 205 is not conveyed to the processing unit 211, and thus, the content of the signal is not analyzed. The first PHY unit 202 or the second PHY unit 205 is capable of receiving (detecting) a signal. In the present exemplary embodiment, when the first PHY unit 202 or the second PHY unit 205 receives (detects) a predetermined signal, the state control unit 212 is notified that the signal has been received.

As a result, the state control unit 212 can transition the state of the node 101 from the standby state S2 to the activated state S1 (transition 304).

The predetermined signal is, for example, a Magic Packet®. The Magic Packet® is a packet that remotely activates a device compatible with Wake on Local Area Network (LAN)®. If the node 101 is a device compatible with Wake on LAN®, the node 101 can transition from the standby state S2 to the activated state S1 by receiving the Magic Packet®. The transmission of the Magic Packet® can be performed by the server device 102, the system controller device 103, or another node 101 connected to the first PHY unit 202.

As described above, the node 101 in the standby state S2 is in the repetition operation state, and thus, it is not possible to perform the protocol processing by the processing unit 211. When the predetermined signal is received (detected), the state control unit 212 can transition the state of the node 101 from the standby state S2 to the activated state S1.

The state of the node 101 can transition from the standby state S2 to the activated state S1 at any timing through control by the processing unit 211.

In the activated state S1, the state control unit 212 can transition the state of the node 101 from the activated state S1 to the power cut-off state S0 if, for example, a signal for transitioning to the power cut-off state S0 is received via the first PHY unit 202 or the second PHY unit 205 (transition 301). The state of the node 101 can transition from the activated state S1 to the power cut-off state S0 at any timing through control by the processing unit 211.

Next, state control of the node 101 at the time of abnormality detection by the sensor unit 213 in the node 101 in the activated state S1 will be described. As described above, the sensor unit 213 performs various types of monitoring processing on the node 101, such as system monitoring and environment monitoring, and detects any abnormality. Upon receiving a notification of abnormality detection from the sensor unit 213, the state control unit 212 transitions to the abnormality detection state S3 (transition 308).

The abnormality detection state S3 is a state where it is determined what kind of abnormality is detected by the sensor unit 213. It is determined whether the abnormality is an abnormality where communication is unavailable in the second path or an abnormality where communication is unavailable in the first and second paths.

If it is determined that the abnormality is the abnormality where communication is unavailable in the second path, the state transitions to the standby state S2 (transition 307). If it is determined that the abnormality is the abnormality where communication is unavailable in the first and second paths, the state transitions to the power cut-off state S0. At this time, the determination is made by the state control unit 212 from the content of the abnormality detected by the sensor unit 213.

If the node 101 transitions to the standby state S2 (transition 307), the node 101 performs a repetition operation, and thus, the function as a network system is maintained. In this case, the system controller device 103 can perform control to restart the network system, including the node 101.

If the node 101 transitions to the power cut-off state S0 (transition 306), the state control unit 212 forcibly cuts off the power supply to the node 101 and stops the function. In this case, communication with other nodes 101 connected to the leaf side of the node 101 is also stopped.

Figure 6A:
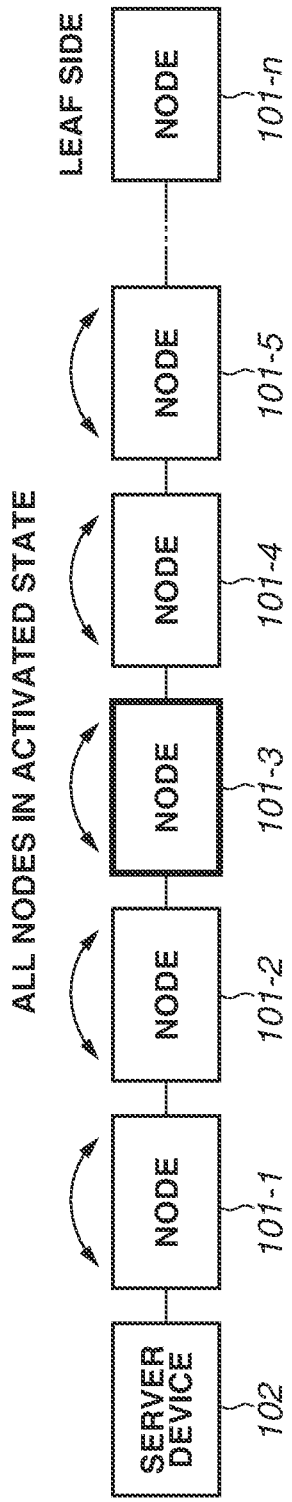
FIGS. 6A, 6B, and 6C are conceptual diagrams each illustrating a connection state between a plurality of nodes.
Figure 6B:
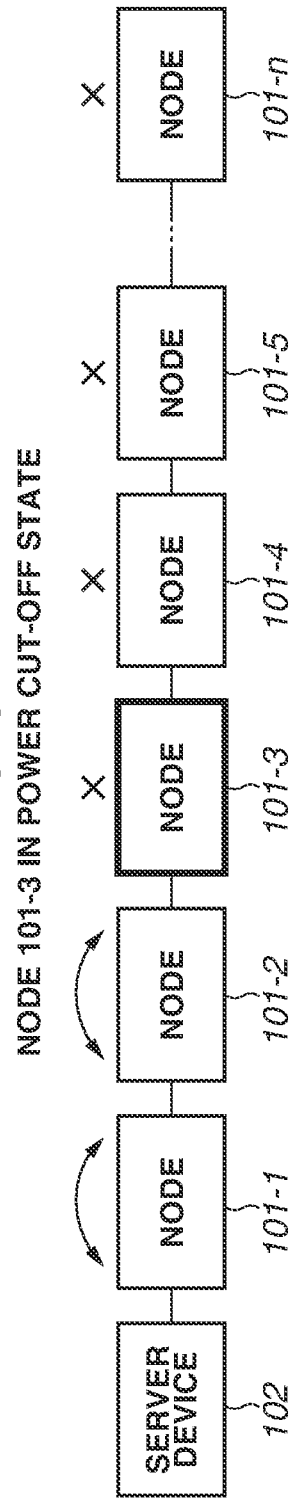
Figure 6C:
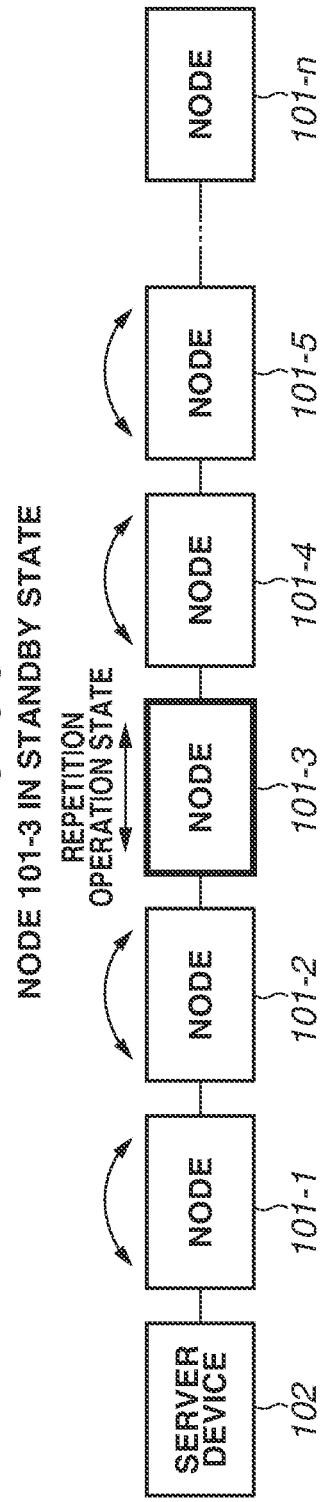

A connection state of the nodes 101 according to the present exemplary embodiment will now be described with reference to FIGS. 6A, 6B, and 6C. As previously described, the nodes 101 according to the present exemplary embodiment form a linear-shaped network and operate the network. FIGS. 6A, 6B, and 6C illustrate the connection state between a plurality of nodes according to the present exemplary embodiment. More specifically, FIGS. 6A, 6B, and 6C illustrate the connection state when the node 101-3 in the network system illustrated in FIG. 1 is in one of the three states described with reference to FIGS. 3 to 5 and the other nodes (nodes 101-1, 101-2, and 101-4 to 101-*n*) are in the activated state S1. FIGS. 6A, 6B, and 6C correspond to the connection states when the node 101-3 is in the activated state S1, the power cut-off state S0, and the standby state S2, respectively.

FIG. 6A illustrates the connection state when all of the nodes 101 including the node 101-3 are in the activated state S1. Since all the nodes 101 are in the activated state S1, it is possible for all the nodes 101 to communicate with each other and the server device 102 to communicate with the nodes 101. The communication path of the signal in the node 101-3 is the path illustrated in FIG. 4, and the signal received by the first PHY unit 202 of the node 101-3 is processed by the processing unit 211 or the like and transferred to the subsequent node 101-4 via the second PHY unit 205.

FIG. 6B illustrates the connection state when the node 101-3 is in the power cut-off state S0. In this case, in the node 101-3, power supply to the processing unit 211, the interconnect unit 210, the first MAC unit 208, and the second MAC unit 209 is cut off, and thus, the communication processing in the node 101-3 is stopped. As a result, the signal is not transmitted from the node 101-3 to the nodes 101-4 to 101-*n* connected on the leaf side.

FIG. 6C illustrates a connection state when the node 101-3 is in the standby state S2. In this case, the bypass control unit 207 conveys the signal received by the first PHY unit 202 to the second PHY unit 205, so that the node 101-3 is set to the repetition operation state. More specifically, while it is not possible to perform the protocol processing by the processing unit 211 in the node 101-3, the communication can be relayed when the node 101-3 shifts to the repetition operation state. As a result, the nodes 101-4 to 101-*n* connected on the leaf side of the node 101-3 can continue the communication.

As described above, according to the present exemplary embodiment, in the network system where a plurality of nodes (communication devices) is arranged in a linear shape, a node in the standby state shifts to the repetition operation. As a result, nodes connected beyond the node (the nodes on the leaf side of the node) can continue communicating in the network. Thus, it is possible to provide a network system with improved availability. In the present exemplary embodiment, the nodes have been described as being connected in a linear shape. In another exemplary embodiment, the same description is applicable to nodes connected in a ring shape (loop shape).

According to the present exemplary embodiment, it is possible to perform communication in a network regardless of the state of the communication device connected to the network.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-156397, filed Sep. 27, 2021, which is hereby incorporated by reference herein in its entirety.

What is claimed is:

1. A communication device, comprising:
a first communication interface for a first transmission path;
a second communication interface for a second transmission path;
a control unit configured to control a communication path internal to the communication device of a signal received by the first communication interface; and
a processing unit configured to perform predetermined processing on the received signal,
wherein the control unit performs control to output, in a case where the communication device is in a first state, the received signal to the second communication interface via the processing unit, and output, in a case where the communication device is in a second state, the received signal to the second communication interface by bypassing the processing unit.

2. The communication device according to claim 1, further comprising a state control unit configured to perform control so that a state of the communication device transitions to one of a plurality of states including the first state and the second state.

3. The communication device according to claim 2, further comprising a sensor unit configured to detect an abnormality in the communication device,
wherein the state control unit controls the state of the communication device based on the detected abnormality.

4. The communication device according to claim 3,
wherein, if the communication device is in an activated state, the sensor unit determines whether the abnormality is an abnormality inside the communication device, and
wherein, if the abnormality inside the communication device is detected by the sensor unit, the state control unit shifts the state of the communication device to the second state.

5. The communication device according to claim 3, wherein if an irrecoverable abnormality is detected by the sensor unit, the state control unit shifts the state of the communication device to a third state where power supply in the communication device is stopped.

6. The communication device according to claim 2, wherein the state control unit controls the state of the communication device based on the signal received by the first communication interface.

7. The communication device according to claim 6, wherein, if a predetermined signal is received by the first communication interface in a case where the communication device is in the second state, the state control unit transitions the state of the communication device to the first state.

8. The communication device according to claim 7, wherein the communication device is compatible with Wake on Local Area Network (LAN) and the predetermined signal is a Magic Packet.

9. The communication device according to claim 1, wherein the first state is an activated state and the second state is a standby state.

10. A communication system comprising:
a plurality of communication devices connected in a linear shape or a ring shape,
wherein each of the plurality of communication devices comprises:
a first communication interface for a first transmission path;
a second communication interface for a second transmission path;
a control unit configured to control a communication path internal to the communication device of a signal received by the first communication interface; and
a processing unit configured to perform predetermined processing on the received signal,
wherein the control unit performs control to output, in a case where the communication device is in a first state, the received signal to the second communication interface via the processing unit, and output, in a case where the communication device is in a second state, the received signal to the second communication interface by bypassing the processing unit.

11. A method for controlling a communication device including a first communication interface for a first transmission path and a second communication interface for a second transmission path, the control method comprising:
performing, in a case where the communication device is in a first state, a first control to execute predetermined protocol processing on a signal received by the first communication interface and output the signal on which the predetermined protocol processing is executed to the second communication interface; and
performing, in a case where the communication device is in a second state, a second control to output the received signal to the second communication interface without executing the predetermined protocol processing on the received signal.

12. A non-transitory computer-readable storage medium storing a computer program for causing a computer to execute a method of controlling a communication device including a first communication interface for a first transmission path and a second communication interface for a second transmission path, the control method comprising:
performing, in a case where the communication device is in a first state, a first control to execute predetermined protocol processing on a signal received by the first communication interface and output the signal on which the predetermined protocol processing is executed to the second communication interface; and
performing, in a case where the communication device is in a second state, a second control to output the received signal to the second communication interface without executing the predetermined protocol processing on the received signal.

* * * * *